(12) United States Patent
Uyeki

(10) Patent No.: US 8,135,804 B2
(45) Date of Patent: Mar. 13, 2012

(54) METHOD FOR SCHEDULING AND RESCHEDULING VEHICLE SERVICE APPOINTMENTS

(75) Inventor: Robert Uyeki, Torrance, CA (US)

(73) Assignee: Honda Motor Co., Ltd., Tokyo (JP)

( * ) Notice: Subject to any disclaimer, the term of this patent is extended or adjusted under 35 U.S.C. 154(b) by 180 days.

(21) Appl. No.: 12/499,060

(22) Filed: Jul. 7, 2009

(65) Prior Publication Data

US 2011/0010432 A1    Jan. 13, 2011

(51) Int. Cl.
*G06F 15/16* (2006.01)

(52) U.S. Cl. ............ 709/219; 709/207; 705/305; 705/4; 705/28; 705/30; 705/400

(58) Field of Classification Search .................. 709/219; 701/33, 35, 395
See application file for complete search history.

(56) References Cited

U.S. PATENT DOCUMENTS

| | | |
|---|---|---|
| 3,839,701 A | 10/1974 | Pomerantz |
| 4,034,336 A | 7/1977 | Arai |
| 4,404,639 A | 9/1983 | McGuire |
| 4,497,057 A | 1/1985 | Kato et al. |
| 4,989,146 A | 1/1991 | Imajo |
| 4,992,947 A | 2/1991 | Nimura et al. |
| 5,220,507 A | 6/1993 | Kirson |
| 5,257,023 A | 10/1993 | Furuya |
| 5,369,588 A | 11/1994 | Hayami et al. |
| 5,388,045 A | 2/1995 | Kamiya et al. |
| 5,420,794 A | 5/1995 | James |
| 5,442,553 A | 8/1995 | Parrillo |
| 5,445,347 A | 8/1995 | Ng |
| 5,506,773 A | 4/1996 | Takaba et al. |
| 5,546,305 A | 8/1996 | Kondo |
| 5,559,511 A | 9/1996 | Ito et al. |
| 5,563,788 A | 10/1996 | Yoon |
| 5,590,040 A | 12/1996 | Abe et al. |
| 5,696,676 A | 12/1997 | Takaba |
| 5,757,645 A | 5/1998 | Schneider et al. |
| 5,774,073 A | 6/1998 | Mackawa et al. |
| 5,801,948 A | 9/1998 | Wood et al. |

(Continued)

FOREIGN PATENT DOCUMENTS

JP          10-054727          2/1998

(Continued)

OTHER PUBLICATIONS

BMW of North America, LLC, "BMW Assist" 2007, http://resource.bmwusa.com/pdf_8e3feb60-1d20-4310-9387-9ab3185cdb61.arox, retrieved Jan. 10, 2008.

(Continued)

*Primary Examiner* — Jude Jean Gilles
(74) *Attorney, Agent, or Firm* — Fenwick & West LLP; Mark Duell

(57) ABSTRACT

The present invention provides a computer based method for enabling or disabling an appointment feature which allows the scheduling of a vehicle service appointment from a vehicle. An embodiment of the method comprises monitoring for the ability to communicate with a remote appointment server to schedule a vehicle service appointment. In response to determining that it is possible to communicate with the appointment server to schedule a vehicle service appointment, the appointment feature is enabled. In response to determining that it is not possible to communicate with the appointment server to schedule a vehicle service appointment, the appointment feature is disabled.

30 Claims, 10 Drawing Sheets

U.S. PATENT DOCUMENTS

| | | |
|---|---|---|
| 5,802,545 A | 9/1998 | Coverdill |
| 5,818,356 A | 10/1998 | Schuessler |
| 5,862,510 A | 1/1999 | Saga et al. |
| 5,878,056 A | 3/1999 | Black et al. |
| 5,892,463 A | 4/1999 | Hikita et al. |
| 5,911,773 A | 6/1999 | Mutsuga et al. |
| 5,928,307 A | 7/1999 | Oshizawa et al. |
| 5,931,878 A | 8/1999 | Chapin, Jr. |
| 5,964,811 A | 10/1999 | Ishii et al. |
| 6,034,626 A | 3/2000 | Maekawa et al. |
| 6,061,629 A | 5/2000 | Yano et al. |
| 6,101,443 A | 8/2000 | Kato et al. |
| 6,195,602 B1 | 2/2001 | Hazama et al. |
| 6,212,483 B1 | 4/2001 | Carew et al. |
| 6,246,320 B1 | 6/2001 | Monroe |
| 6,292,723 B1 | 9/2001 | Brogan et al. |
| 6,308,120 B1 | 10/2001 | Good |
| 6,323,885 B1 | 11/2001 | Wiese |
| 6,329,925 B1 | 12/2001 | Skiver et al. |
| 6,330,499 B1 | 12/2001 | Chou et al. |
| 6,337,621 B1 | 1/2002 | Ogino et al. |
| 6,339,736 B1 | 1/2002 | Moskowitz et al. |
| 6,356,822 B1 | 3/2002 | Diaz et al. |
| 6,362,730 B2 | 3/2002 | Razavi et al. |
| 6,370,454 B1 | 4/2002 | Moore |
| 6,381,533 B1 | 4/2002 | Crane et al. |
| 6,389,337 B1 | 5/2002 | Kolls |
| 6,405,129 B1 | 6/2002 | Yokota |
| 6,405,130 B1 | 6/2002 | Piwowarski |
| 6,421,593 B1 | 7/2002 | Kempen et al. |
| 6,434,455 B1 | 8/2002 | Snow et al. |
| 6,442,241 B1 | 8/2002 | Tsumpes |
| 6,459,961 B1 | 10/2002 | Obradovich et al. |
| 6,477,452 B2 | 11/2002 | Good |
| 6,480,105 B2 | 11/2002 | Edward |
| 6,484,094 B1 | 11/2002 | Wako |
| 6,509,868 B2 | 1/2003 | Flick |
| 6,526,335 B1 | 2/2003 | Treyz et al. |
| 6,539,269 B1 | 3/2003 | Jarrow et al. |
| 6,542,794 B2 | 4/2003 | Obradovich |
| 6,542,814 B2 | 4/2003 | Polidi et al. |
| 6,549,833 B2 | 4/2003 | Katagishi et al. |
| 6,553,289 B2 | 4/2003 | Maki et al. |
| 6,553,290 B1 | 4/2003 | Pillar |
| 6,577,934 B2 | 6/2003 | Matsunaga et al. |
| 6,587,759 B2 | 7/2003 | Obradovich et al. |
| 6,591,094 B1 | 7/2003 | Bentley |
| 6,604,038 B1 | 8/2003 | Lesesky et al. |
| 6,609,004 B1 | 8/2003 | Morse et al. |
| 6,609,050 B2 | 8/2003 | Li |
| 6,611,740 B2 | 8/2003 | Lowrey et al. |
| 6,615,186 B1 | 9/2003 | Kolls |
| 6,630,813 B2 | 10/2003 | Berels et al. |
| 6,643,355 B1 | 11/2003 | Tsumpes |
| 6,662,090 B2 | 12/2003 | Toyama et al. |
| 6,662,091 B2 | 12/2003 | Wilson et al. |
| 6,668,219 B2 | 12/2003 | Hwang et al. |
| 6,677,854 B2 | 1/2004 | Dix |
| 6,678,591 B2 * | 1/2004 | Ohmura et al. ............... 701/29 |
| 6,693,563 B2 | 2/2004 | Flick |
| 6,694,234 B2 | 2/2004 | Lockwood et al. |
| 6,701,231 B1 | 3/2004 | Borugian |
| 6,701,232 B2 | 3/2004 | Yamaki |
| 6,711,474 B1 | 3/2004 | Treyz et al. |
| 6,720,920 B2 | 4/2004 | Breed et al. |
| 6,721,685 B2 | 4/2004 | Kodama |
| 6,732,031 B1 | 5/2004 | Lightner et al. |
| 6,735,504 B2 | 5/2004 | Katagishi et al. |
| 6,738,697 B2 | 5/2004 | Breed |
| 6,754,485 B1 | 6/2004 | Obradovich et al. |
| 6,754,570 B2 | 6/2004 | Iihoshi et al. |
| 6,756,999 B2 | 6/2004 | Stoakley et al. |
| 6,757,712 B1 | 6/2004 | Bastian et al. |
| 6,804,589 B2 | 10/2004 | Foxford et al. |
| 6,813,549 B2 | 11/2004 | Good |
| 6,816,878 B1 | 11/2004 | Zimmers et al. |
| 6,819,986 B2 | 11/2004 | Hong et al. |
| 6,829,532 B2 | 12/2004 | Obradovich et al. |
| 6,836,539 B2 | 12/2004 | Katou et al. |
| 6,839,628 B1 | 1/2005 | Tu |
| 6,847,871 B2 | 1/2005 | Malik et al. |
| 6,847,872 B2 | 1/2005 | Bodin et al. |
| 6,850,823 B2 | 2/2005 | Eun et al. |
| 6,853,894 B1 | 2/2005 | Kolls |
| 6,856,901 B2 | 2/2005 | Han |
| 6,865,480 B2 | 3/2005 | Wong |
| 6,882,931 B2 | 4/2005 | Inoue |
| 6,901,374 B1 | 5/2005 | Himes |
| 6,909,944 B2 | 6/2005 | Pillar et al. |
| 6,920,382 B2 | 7/2005 | Katagishi et al. |
| 6,922,629 B2 | 7/2005 | Yoshikawa et al. |
| 6,944,430 B2 | 9/2005 | Berstis |
| 6,973,166 B1 | 12/2005 | Tsumpes |
| 6,983,200 B2 | 1/2006 | Bodin et al. |
| 6,987,964 B2 | 1/2006 | Obradovich et al. |
| 6,993,421 B2 | 1/2006 | Pillar et al. |
| 7,006,903 B2 | 2/2006 | Smith et al. |
| 7,016,774 B2 | 3/2006 | Barber et al. |
| 7,023,332 B2 | 4/2006 | Saito et al. |
| 7,031,832 B2 | 4/2006 | Kawasaki et al. |
| 7,082,359 B2 | 7/2006 | Breed |
| 7,124,004 B2 | 10/2006 | Obradovich |
| 7,877,176 B2 * | 1/2011 | Reeser et al. ............... 701/29 |
| 2002/0016655 A1 | 2/2002 | Joao |
| 2002/0032507 A1 | 3/2002 | Diaz et al. |
| 2002/0035521 A1 * | 3/2002 | Powers ............... 705/28 |
| 2002/0044049 A1 | 4/2002 | Saito et al. |
| 2002/0049535 A1 | 4/2002 | Rigo et al. |
| 2002/0055811 A1 | 5/2002 | Obradovich et al. |
| 2002/0065605 A1 | 5/2002 | Yokota |
| 2002/0073012 A1 | 6/2002 | Lowell et al. |
| 2002/0077741 A1 | 6/2002 | Hanebrink |
| 2002/0080022 A1 | 6/2002 | Edwards |
| 2002/0087237 A1 | 7/2002 | Ol et al. |
| 2002/0103582 A1 | 8/2002 | Ohmura et al. |
| 2002/0103583 A1 * | 8/2002 | Ohmura et al. ............... 701/33 |
| 2002/0130906 A1 | 9/2002 | Miyaki |
| 2002/0138196 A1 | 9/2002 | Polidi et al. |
| 2002/0156692 A1 | 10/2002 | Squeglia et al. |
| 2002/0161495 A1 | 10/2002 | Yamaki |
| 2002/0161496 A1 | 10/2002 | Yamaki |
| 2002/0161841 A1 | 10/2002 | Kinnunen |
| 2002/0177926 A1 | 11/2002 | Lockwood et al. |
| 2002/0193923 A1 | 12/2002 | Toyama et al. |
| 2002/0193926 A1 | 12/2002 | Katagishi et al. |
| 2002/0198632 A1 | 12/2002 | Breed et al. |
| 2002/0198637 A1 | 12/2002 | Shibata |
| 2003/0001736 A1 | 1/2003 | Lewis |
| 2003/0028297 A1 | 2/2003 | Iihoshi et al. |
| 2003/0034882 A1 | 2/2003 | Banerjee et al. |
| 2003/0095038 A1 | 5/2003 | Dix |
| 2003/0109972 A1 | 6/2003 | Tak |
| 2003/0158640 A1 | 8/2003 | Pillar et al. |
| 2003/0167110 A1 | 9/2003 | Smith et al. |
| 2003/0167120 A1 | 9/2003 | Kawasaki |
| 2003/0182034 A1 | 9/2003 | Katagishi et al. |
| 2003/0182052 A1 | 9/2003 | DeLorme et al. |
| 2003/0195814 A1 | 10/2003 | Striemer |
| 2003/0227381 A1 | 12/2003 | Best, Jr. |
| 2004/0012501 A1 | 1/2004 | Mazzara et al. |
| 2004/0044605 A1 | 3/2004 | Kress et al. |
| 2004/0048622 A1 | 3/2004 | Witkowski et al. |
| 2004/0059613 A1 | 3/2004 | Ford et al. |
| 2004/0059618 A1 | 3/2004 | Ford et al. |
| 2004/0059781 A1 | 3/2004 | Yoakum et al. |
| 2004/0085198 A1 | 5/2004 | Saito et al. |
| 2004/0093155 A1 | 5/2004 | Simonds et al. |
| 2004/0093243 A1 | 5/2004 | Bodin |
| 2004/0093299 A1 | 5/2004 | Bodin et al. |
| 2004/0098195 A1 | 5/2004 | Listle et al. |
| 2004/0150534 A1 | 8/2004 | Linn |
| 2004/0203379 A1 | 10/2004 | Witkowski et al. |
| 2004/0204821 A1 | 10/2004 | Tu |
| 2004/0225437 A1 | 11/2004 | Endo et al. |
| 2004/0243306 A1 | 12/2004 | Han |
| 2004/0249529 A1 | 12/2004 | Kelly et al. |
| 2004/0249530 A1 | 12/2004 | Kelly et al. |

| | | |
|---|---|---|
| 2004/0249531 A1 | 12/2004 | Kelly et al. |
| 2004/0249532 A1 | 12/2004 | Kelly et al. |
| 2004/0249568 A1 | 12/2004 | Endo et al. |
| 2004/0252197 A1 | 12/2004 | Fraley et al. |
| 2004/0254723 A1 | 12/2004 | Tu |
| 2004/0260465 A1 | 12/2004 | Tu |
| 2005/0015186 A1 | 1/2005 | Kelly et al. |
| 2005/0021197 A1 | 1/2005 | Zimmerman et al. |
| 2005/0021199 A1 | 1/2005 | Zimmerman et al. |
| 2005/0038581 A1 | 2/2005 | Kapolka et al. |
| 2005/0043880 A1 | 2/2005 | Yamane et al. |
| 2005/0046615 A1 | 3/2005 | Han |
| 2005/0060070 A1 | 3/2005 | Kapolka et al. |
| 2005/0065678 A1 | 3/2005 | Smith et al. |
| 2005/0068174 A1 | 3/2005 | Oesterling et al. |
| 2005/0080519 A1 | 4/2005 | Oesterling et al. |
| 2005/0090951 A1 | 4/2005 | Good |
| 2005/0091368 A1 | 4/2005 | Ozburn |
| 2005/0096811 A1 | 5/2005 | Bodin et al. |
| 2005/0096842 A1 | 5/2005 | Tashiro |
| 2005/0102102 A1 | 5/2005 | Linn |
| 2005/0125117 A1 | 6/2005 | Breed |
| 2005/0137763 A1 | 6/2005 | Watkins et al. |
| 2005/0140524 A1 | 6/2005 | Kato et al. |
| 2005/0143882 A1 | 6/2005 | Umezawa |
| 2005/0156718 A1 | 7/2005 | Flick |
| 2005/0176482 A1 | 8/2005 | Raisinghani et al. |
| 2005/0184862 A1 | 8/2005 | Nagata |
| 2005/0222751 A1 | 10/2005 | Uyeki |
| 2005/0222760 A1 | 10/2005 | Cabral et al. |
| 2005/0222761 A1 | 10/2005 | Uyeki et al. |
| 2005/0222762 A1 | 10/2005 | Hamilton et al. |
| 2005/0222763 A1 | 10/2005 | Uyeki et al. |
| 2005/0222764 A1 | 10/2005 | Uyeki et al. |
| 2005/0270152 A1 | 12/2005 | Harumoto et al. |
| 2005/0273218 A1 | 12/2005 | Breed et al. |
| 2005/0288830 A1 * | 12/2005 | Reeser et al. ............... 701/2 |
| 2006/0038674 A1 | 2/2006 | Sumead et al. |
| 2006/0047415 A1 | 3/2006 | Groskreutz et al. |
| 2006/0247832 A1 | 11/2006 | Taki |
| 2006/0253235 A1 | 11/2006 | Bi et al. |
| 2007/0005202 A1 | 1/2007 | Breed |
| 2007/0018797 A1 | 1/2007 | Chen et al. |
| 2009/0106036 A1 * | 4/2009 | Tamura et al. ............... 705/1 |

FOREIGN PATENT DOCUMENTS

| | | |
|---|---|---|
| JP | 2000-201104 | 7/2000 |
| JP | 2003-022330 | 1/2003 |
| JP | 2006-003961 | 1/2006 |

OTHER PUBLICATIONS

Mercedes-Benz USA, "Tele Aid" http://www.mbusa.com/care/client-care/teleaid.do, retrieved Jan. 10, 2008.

OnStar Corp., "GM's Total Value Promise to Feature OnStar's New Vehicle Diagnostic Service" Sep. 13, 2005, http://www.onstar.com/us_english/jsp/ new_at_onstar/ovd.jsp, retrieved Jan. 10, 2008.

SpeechTechMag.com, "ATX Launches vRM" May 1, 2003, http://www.speechtechmag.com/Articles/News~Industry-News~ATX-Launches-vRM-34165.aspx, retrieved Jan. 10, 2008.

* cited by examiner

METHOD FOR SCHEDULING AND RESCHEDULING VEHICLE SERVICE APPOINTMENTS

CROSS-REFERENCE TO RELATED APPLICATION

This application is related to U.S. patent application Ser. No. 11/866,372, filed Oct. 2, 2007 and to U.S. patent application Ser. No. 11/876,758, filed Oct. 22, 2007. These applications are hereby incorporated by reference herein.

FIELD OF THE INVENTION

This invention generally relates to scheduling and rescheduling vehicle service appointments from a vehicle and more particularly to handling the situation where the vehicle is unable to communicate with a remote server to schedule or reschedule an appointment.

BACKGROUND OF THE INVENTION

Occasionally a user of a vehicle will schedule an appointment with a dealer. One reason to schedule an appointment with a dealer is because there is a problem with the vehicle. Another reason to schedule an appointment with a dealer is to have routine maintenance done on the vehicle (e.g., oil change or 30,000 mile service). One way of scheduling a service appointment is using an automated appointment system. The automated appointment system conveniently allows the user of the vehicle to schedule an appointment from the vehicle. When a user selects to schedule a service appointment with a dealer using the automated appointment system, the vehicle communicates with a remote appointment server to schedule a service appointment for the vehicle.

However, occasionally when the user selects to schedule a servicing appointment using the automated appointment system, the vehicle may not be able to communicate with the appointment server to schedule the appointment. The communication problem may occur, for example, if the vehicle is in a bad reception area (e.g., in an underground parking garage) or the appointment server is experiencing problems. Currently, if there are communication problems, the user has to make periodic appointment requests until the vehicle is able to communicate with the appointment server. However, the periodic appointment requests may distract the user from the core task of driving or may cause the user to become frustrated, especially if the communication problems continue for an extended period of time.

Thus, there is a need for a safe and user-friendly way of handling the situation where the vehicle is unable to communicate with the remote server to schedule or reschedule a vehicle service appointment with a dealer.

SUMMARY OF THE INVENTION

The present invention provides a computer based method for enabling or disabling an appointment feature which allows the scheduling of a vehicle service appointment from a vehicle. An embodiment of the method comprises monitoring for the ability to communicate with a remote appointment server to schedule a vehicle service appointment. In response to determining that it is possible to communicate with the appointment server to schedule a vehicle service appointment, the appointment feature is enabled. In response to determining that it is not possible to communicate with the appointment server to schedule a vehicle service appointment, the appointment feature is disabled.

The present invention also provides a computer based method for scheduling a vehicle service appointment from a vehicle. An embodiment of the method comprises detecting a request, at the vehicle, to schedule a vehicle service appointment. A determination is made as to whether it is possible to communicate with an appointment server to schedule the appointment. In response to determining that it is not possible to communicate with the appointment server, monitoring for the ability to communicate with the appointment server occurs. In response to detecting via the monitoring that it is possible to communicate with the appointment server, a message is presented indicating that it is possible to request the scheduling of a vehicle service appointment.

In one embodiment, in response to detecting via the monitoring that it is possible to communicate with the appointment server, instead of presenting a message, a request for the scheduling of the appointment is automatically transmitted to the appointment server.

In one embodiment, when a request to schedule a vehicle service appointment is detected and it is determined that is not possible to communicate with the appointment server, the ability to communicate with a computing device is monitored. In response to detecting via the monitoring that it is possible to communicate with the appointment server, an off-board reminder message is transmitted to the computing device.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

Figure (FIG.) 1A is a high-level block diagram of a system for the exchange of information between a vehicle and an appointment server according to one embodiment.

DETAILED DESCRIPTION OF THE INVENTION

Figure 1A:
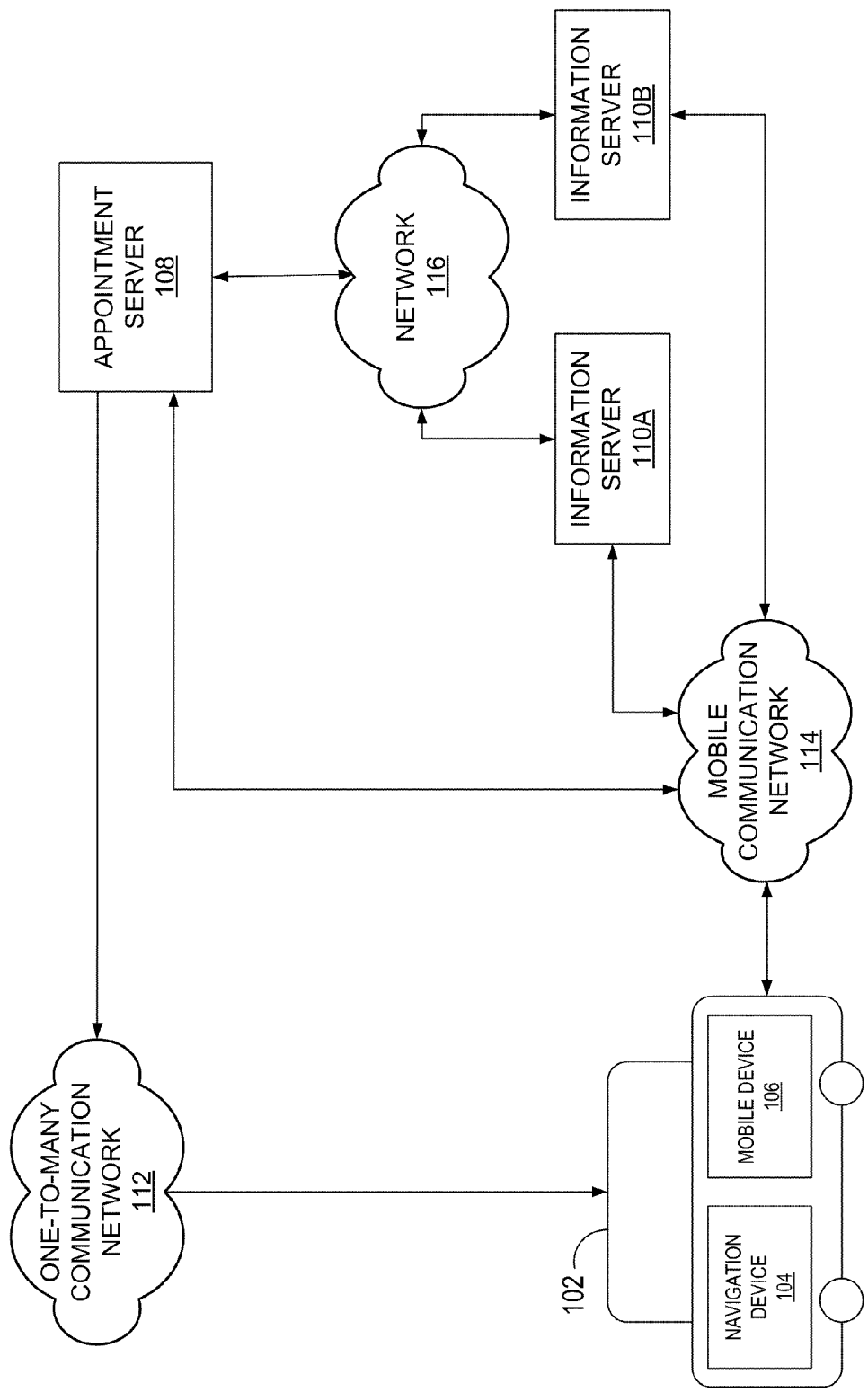
FIG. 1B is a high-level block diagram of a system for the exchange of information between a vehicle and an appointment server according to an alternate embodiment.

A preferred embodiment of the present invention is now described with reference to the figures where like reference numbers indicate identical or functionally similar elements. In the figures, a letter after a reference numeral, such as "110A," indicates that the text refers specifically to the element having that particular reference numeral. A reference numeral in the text without a following letter, such as "110," refers to any or all of the elements in the figures bearing that reference numeral (e.g. "110" in the text refers to reference numerals "110A," and/or "110B" in the figures). Also in the figures, the left most digits of each reference number correspond to the figure in which the reference number is first used.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims. Also, as used herein scheduling can refer to scheduling or rescheduling.

FIG. 1A is a high-level block diagram of a system for the exchange of information between a vehicle 102 and an appointment server 108 according to one embodiment. The vehicle 102 includes a navigation device 104 and a mobile device 106. The navigation device 104 represents an entity that allows a user of the vehicle to schedule or reschedule a vehicle service appointment with a dealer. As used herein, the term "dealer" refers to any entity that may repair or service a vehicle.

When the navigation device 104 receives a request from a user of the vehicle 102 to schedule or reschedule a vehicle service appointment, the navigation device 104 transmits an appointment request to the appointment server 108. The appointment request may include one or more of the following: identification information of the user, identification information of the vehicle, one or more triggered Diagnostic Trouble Codes (DTCs), DTC analysis information, type of service needed, and geographical location of the vehicle 102. In one embodiment, a user of the vehicle 102 can request to schedule or reschedule a service appointment at anytime. In another embodiment, a user can only request to schedule or reschedule a service appointment when a specific event is detected, such as a DTC being triggered or a service reminder being triggered.

In response to the request transmitted, the navigation device 104 receives from the appointment server 108 a proposed date and time for a service appointment with a dealer. The navigation device 104 presents to the user the proposed appointment. The user has the option to accept or reject the proposed appointment. When the navigation device 104 receives a decision from the user, appointment accepted or rejected, the navigation device 104 transmits the decision to the appointment server 108. If the user accepted the proposed appointment and the appointment server 108 successfully scheduled the accepted appointment with the dealer, the navigation device 104 receives from the appointment server 108 a message confirming the scheduling of the appointment. The navigation device 104 presents the message to the user. If the user rejected the appointment, the navigation device 104 receives from the appointment server 108 an alternate proposed appointment, which is presented to the user.

In one embodiment, the navigation device 104 continuously or periodically monitors for the ability to communicate with the appointment server 108 to schedule or reschedule a service appointment. If the navigation device 114 determines that it is possible to communicate with appointment server 108, the navigation device 104 enables the feature of scheduling or rescheduling a service appointment from the vehicle, which is referred to herein as the appointment feature. However, if the navigation device 104 determines that it is not possible to communicate with the appointment server 108, the navigation device 104 disables the appointment feature. The appointment feature remains disabled until the navigation device 104 determines that it is possible to communicate with the appointment server 108. When the appointment feature is enabled, a user of the vehicle can request through the navigation device 104 the scheduling or rescheduling of a service appointment. However, when the appointment feature is disabled, a user is unable to request the scheduling or rescheduling of a service appointment.

In one embodiment, when the navigation device 104 receives a request from a user to schedule or reschedule a service appointment, the navigation device 104 determines whether it is possible to communicate with the appointment server 108 to schedule or reschedule a service appointment. If the navigation device 104 determines that it is not possible to communicate with the appointment server 108, the navigation device 104 disables the appointment feature. The navigation device 114 monitors for the ability to communicate with the appointment server 108. When the navigation device 104 determines it is possible to communicate with the appointment server 108, the navigation device 104 enables the appointment feature and presents a message to the user. The message notifies the user that he or she can now request the scheduling or rescheduling of a service appointment.

In one embodiment, when the navigation device 104 determines that it is possible to communicate with appointment server 108, instead of presenting a message to the user at the vehicle 102, the navigation device 104 automatically transmits an appointment request to the appointment server 108. In response to the request, the navigation device 104 receives from the appointment server 108, a proposed date and time for an appointment. The navigation device 104 presents the proposed appointment to the user.

In one embodiment, when the navigation device 104 receives a request from a user to schedule or reschedule a service appointment and the navigation device 104 determines that it is not possible to communicate with the appointment server 108, the appointment server 108 monitors for the ability to communicate with a computing device to which an off-board reminder message is to be sent. When it is determined that it is possible to communicate with the computing device, the navigation device 104 transmits the off-board reminder message to the computing device. The computing device may be, for example, a cell phone, a personal digital assistant (PDA), a pager, or a server (e.g., email server). The off-board reminder message indicates that the user attempted to schedule or reschedule a service appointment, but was unable to do so and an appointment still needs to be scheduled.

In one embodiment, the navigation device 104 uses the mobile device 106 to transmit and receive data to and from the appointment server 108 through a mobile communication network 114. The mobile device 106 represents a cell phone or any other device that can receive and transmit data through the wireless communication network 114. In one embodiment the mobile device 106 is embedded in the vehicle 102 and is in communication with the navigation device 104 by, for example, a cable (not shown). In another embodiment, the navigation device 104 and the mobile device 106 wirelessly communicate with each other. In one embodiment, the data exchanged between the navigation device 104 and the mobile device 106 complies with the Bluetooth® wireless protocol.

In one embodiment, the mobile device 106 generates signal strength information. The signal strength information indicates the device's 106 ability to communicate with computing devices (e.g., the appointment server 108 or another mobile device) connected to the mobile communication network 114. In one embodiment, the signal strength information generated by the mobile device 106 is in the form of a measurement (e.g., dB-microvolts per meter). If the measurement generated by the mobile device 106 is below a threshold, it indicates that the mobile device 106 cannot communicate with computing devices connected to the mobile communication network 114.

The mobile communication network 114 represents a communication pathway between the vehicle 102 and the appointment server 108. In one embodiment, the mobile communication network 114 is comprised of multiple base stations. Data channels (e.g., high bandwidth GPRS/1XRTT channels, low bandwidth DTMF channels, etc.) are used to carry data through the wireless communication network 114. The navigation device 104 also uses the mobile communication network 114 to transmit and receive information from information servers 110A and 110B. The information servers 110 represent entities that provide information to the navigation device 104. Examples of information servers include government traffic information suppliers and private traffic information suppliers. It should be understood that even though only two information servers 110 are shown in FIG. 1A, any number of information servers 110 can be connected to the mobile communication network 114.

In one embodiment, the navigation device 104 receives data from the appointment server 108 via a one-to-many communication network 112. The one-to-many communication network 112 represents a communication pathway through which a source can send data to a plurality of receivers, such as a broadcast network. In this embodiment, the appointment server 108 is the source and the navigation device 104 is a receiver. In one embodiment, the one-to-many communication network 112 is comprised of multiple broadcast towers and satellites. The broadcast towers transmit data from the appointment server 108 to the satellites, which bounce the data to the navigation device 104.

The navigation device 104 can give a user of the vehicle 102 travel directions. When a user requests directions to a desired location, the navigation device 104 determines the current geographical location of the vehicle and a route to get from the current location to the desired location. The navigation device 104 provides the user with directions to get to the desired location along the determined route.

The appointment server 108 represents an entity that communicates with navigation devices of vehicles to schedule or reschedule service appointments for vehicles. When the appointment server 108 receives from the navigation device 104 a request to schedule or reschedule a service appointment, the appointment server 108 identifies identification information included in the request. The identification information identifies the user of the vehicle 102 and/or the vehicle 102. The appointment server 108 uses the identification information to retrieve preference information associated with the user of the vehicle 102 and/or the vehicle 102. The preference information may include, for example, a preferred service dealer, days of the week that appointments are preferred, times when appointments are preferred, and dates or times when the user is unavailable. If the request received by the appointment server 108 is to reschedule a service appointment, the appointment server 108 also identifies the currently scheduled appointment for the vehicle 102.

Once the preference information has been retrieved, the appointment server 108 identifies the dealer that will service the vehicle and the dealer's service appointment schedule. In one embodiment, the dealer is identified using the retrieved preference information. In another embodiment, the dealer is identified using the current geographical location of the vehicle 104, which was included in the request received from the navigation device 104. The appointment server 108 uses one or more of the following to determine a proposed data and time for an appointment: dealer's service appointment schedule, preference information, one or more DTCs triggered in the vehicle 102, DTC analysis information, type of service needed, part availability at the dealer, and current geographical location of the vehicle 102. The appointment server 108 transmits the determined proposed appointment to the navigation device 104.

At some point, the appointment server 108 receives a decision from the navigation device 104 as to whether the proposed appointment has been accepted or rejected. If the appointment was accepted, the appointment server 108 schedules the appointment in the dealer's schedule. Additionally, if the original request received from the navigation device 104 was to reschedule an appointment, the navigation device 104 cancels the originally scheduled appointment when the proposed appointment is accepted and scheduled. If the decision received from the navigation device 104 is that the appointment was rejected, the appointment server 108 determines an alternate proposed time and date for a service appointment and transmits the alternate proposed appointment to the navigation device 104.

The appointment server 108 is connected to the information servers 110 by a network 116. In one embodiment, the network 106 is the Internet, but may also be any network, including but not limited to a LAN, a MAN, a WAN, a wired or wireless network, a private network, or a virtual private network, and any combination thereof. In addition, all or some of the links can be encrypted using conventional encryption technologies such as the secure sockets layer (SSL), Secure HTTP and/or virtual private networks (VPNs). In another embodiment, the entities connected to the network 116 can use custom and/or dedicated data communications technologies instead of, or in addition to, the ones described above. In one embodiment, the information servers 110 transmit information to the appointment server 108 via the network and the appointment server 108 forwards the information to the navigation device 104 via the one-to-many communication network 112 or the mobile communication network 114.

Figure 1B:
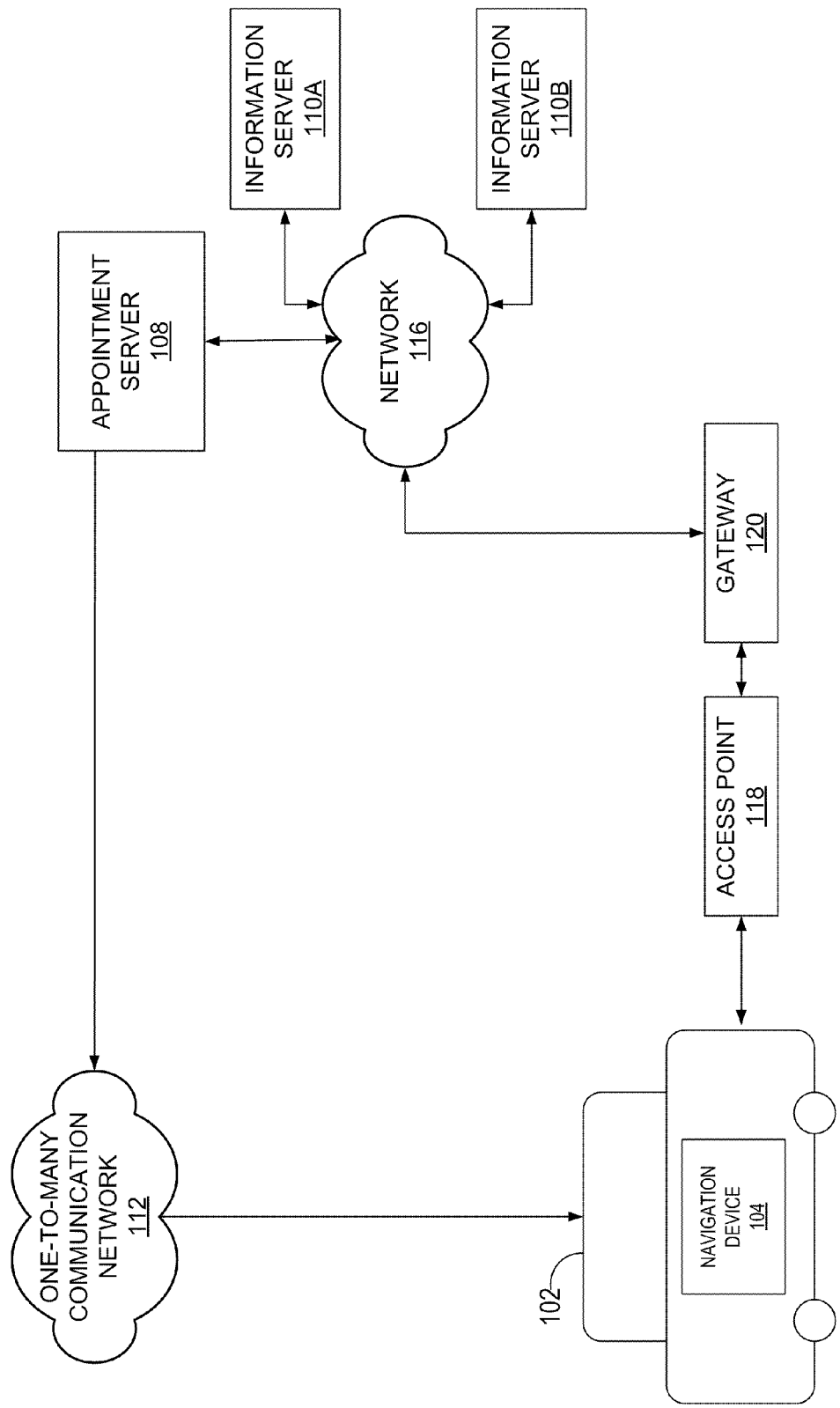

FIG. 1B is a high-level block diagram of a system for the exchange of information between the vehicle 102 and the appointment server 108 according to an alternate embodiment. As can be seen, the system of FIG. 1B is the same as that of FIG. 1A, except in the system of FIG. 1B, the mobile device 106 is not included in the vehicle 102 and system does not include the mobile communication network 114. Instead the system includes an access point 118 and a gateway 120.

In this embodiment, the navigation device 104 transmits and receives data to and from the appointment server 108 using the access point 118 and the gateway 120. The access point 118 represents a device that allows the navigation device 104 to wirelessly communicate with the appointment server 108 through network 116. In one embodiment, the data exchanged between the navigation device 104 and the access point 118 complies with the IEEE 802.11 standard. In one embodiment, the navigation device 104 and the access point include Wi-Fi® or DSRC/WAVE (802.11p) equipment. The access point 118 is typically in communication with the gateway 120 by way of a cable, and the gateway is communication with the appointment server 108 by way of the network 116.

In one embodiment, the access point 118 has a limited range over which it can communicate with the navigation device 104. Thus, there may be numerous access points positioned so that the distance between the access points and the areas through which the vehicle 102 might pass is less than or equal to the limited range of the access point 118.

Figure 2:
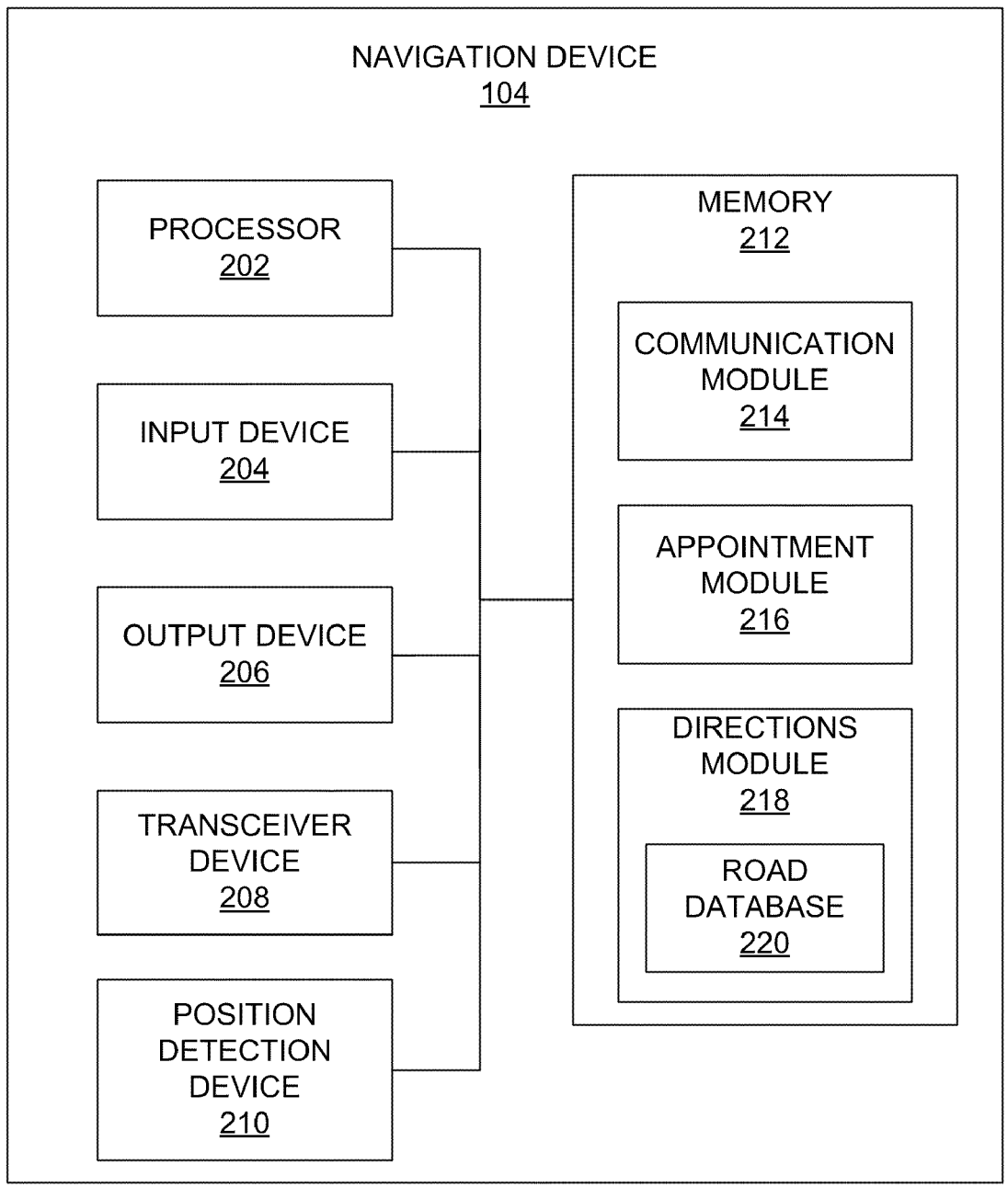
FIG. 2 is a high-level block diagram illustrating a detailed view of the navigation device according to one embodiment.

FIG. 2 is a high-level block diagram illustrating a detailed view of the navigation device 104 according to one embodiment. The navigation device 104 comprises a processor 202, an input device 204, an output device 206, a transceiver device 208, a position detection device 210, and a memory 212.

The processor 202 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2, multiple processors may be included. The processor 202 comprises an arithmetic logic unit, a microprocessor, a general purpose computer, or some other information appliance equipped to transmit, receive and process electronic data signals from the memory 212, the input device 204, the output device 206, the transceiver device 208, or the position detection device 210.

The input device 204 is any device configured to provide user input to the navigation device 104 such as, a cursor controller or a keyboard. In one embodiment, the input device 204 can include an alphanumeric input device, such as a QWERTY keyboard, a key pad or representations of such created on a touch screen, adapted to communicate information and/or command selections to processor 202 or memory 212. In another embodiment, the input device 204 is a user input device equipped to communicate positional data as well as command selections to processor 202 such as a joystick, a mouse, a trackball, a stylus, a pen, a touch screen, cursor direction keys or other mechanisms to cause movement adjustment of an image.

The output device 206 represents any device equipped to display electronic images and data as described herein. Output device 206 may be, for example, an organic light emitting diode display (OLED), liquid crystal display (LCD), cathode ray tube (CRT) display, or any other similarly equipped display device, screen or monitor. In one embodiment, output device 206 is equipped with a touch screen in which a touch-sensitive, transparent panel covers the screen of output device 206. In one embodiment, the output device 206 is equipped with a speaker that outputs audio as described herein.

The transceiver device 208 represents a device that allows the navigation device 104 to communicate with the appointment server 108. In one embodiment, the transceiver device 208 is for one or more of the following communications: infrared communication, IEEE 802.11a/b/g/n/p communication, Bluetooth® communication, 3G communication, IEEE 802.16 (or WiMax) communication, or radio frequency communication. In the system of FIG. 1A, the transceiver device 208 is used by the navigation device 104 to communicate with the mobile device 106. Additionally, the transceiver device 208 is used by the navigation device 104 to receive data through the one-to-many communication network 112. In the system of FIG. 1B, the transceiver device 208 is used by the navigation device 104 to communicate with the access point 118. Although a single transceiver device 208 is shown, it should be understood that the navigation device 104 may include multiple transceiver devices.

The position detection device 210 represents a device that communicates with a plurality of positioning satellites (e.g., GPS satellites) to determine the geographical location of the vehicle 102. In one embodiment, to determine the location of the vehicle 102, the position detection device 210 searches for and collects GPS information or signals broadcast from four or more GPS satellites that are in view of the position detection device 210. Using the time interval between the broadcast time and reception time of each broadcast signal, the position detection device 210 calculates the distance between the vehicle 102 and each of the four or more GPS satellites. These distance measurements, along with the position and time information received in the broadcast signals, allow the position detection device 210 to calculate the geographical location of the vehicle 102.

In one embodiment, similar to the mobile device 106, the position detection device 210 generates signal strength information. The signal strength information indicates the device's 210 ability to communicate with positioning satellites. In one embodiment, the signal strength information generated by the position detection device 210 is in the form of a measurement. If the measurement generated by the position detection device 24 is below a threshold, it indicates that the position detection device 210 cannot communicate with the positioning satellites.

The memory 212 stores instructions and/or data that may be executed by processor 202. The instructions and/or data may comprise code for performing any and/or all of the techniques described herein. Memory 212 may be a dynamic random access memory (DRAM) device, a static random access memory (SRAM) device, Flash RAM (non-volatile storage), combinations of the above, or some other memory device known in the art. The memory 212 comprises a communication module 214, an appointment module 216, and a directions module 218. The modules are adapted to communicate with the processor 202, the input device 204, the output device 206, the transceiver device 208, and/or the position detection device 210.

The communication module 214 determines whether it is possible to communicate with the appointment server 108 to schedule or reschedule a vehicle service appointment. In one embodiment, where the mobile device 106 is used to communicate with the appointment server 108, the communication module 214 determines whether it is possible to communicate with the appointment server 108 based on signal strength information generated by the mobile device 106. The communication module 214 receives the signal strength information from the mobile device 106 through the transceiver device 208. If the signal strength information does not meet set criteria (e.g., signal strength measurement below a threshold), the communication module 214 determines that it is not possible to communicate with the appointment server 108 to schedule or reschedule an appointment.

In one embodiment, the communication module 214 determines whether it is possible to communicate with the appointment server 108 based on signal strength information generated by the position detection device 210. The communication module 214 analyzes the signal strength information generated by the position detection device 210. If the signal strength information does not meet set criteria, the communication module 214 determines that it is not possible to communicate with the appointment server 108 to schedule or reschedule an appointment.

In one embodiment, to determine whether it is possible to communicate with the appointment server 108, the communication module 214 actually attempts to communicate with the appointment server 108 through the transceiver device 208. If the communication module 214 is not able to communicate with the appointment server 108, the communication module 214 determines that it is currently not possible to communicate with the appointment server 108. For example, to determine whether it is possible to communicate with the appointment server 108, the communicate module 214 may attempt to transmit a test message to the appointment server 108. If the test message fails to be transmitted to the appointment server 108 or no response is received from the appointment server 108, the communication module 214 determines that it is not possible to communicate with the appointment server 108 to schedule or reschedule an appointment. The reason a response to the test message may not be received from the appointment server 108, could be because the appointment server 108 is experiencing problems. If a response to the test message is received by the communication module 214 it is determined that it is possible to communicate with the appointment server 108.

In one embodiment, to determine whether it is possible to communicate with the appointment server 108, the communication module 214 retrieves a stored schedule that indicates dates and times when the appointment server 108 will be unavailable for scheduling or rescheduling appointments. One reason that the appointment server 108 may not be available during such dates and times is because maintenance work is being done on the server 108. The appointment server 108 analyzes the schedule and determines whether the current date and time is included in the schedule. If the current date and time is included in the schedule, the appointment server 108 determines that it is not possible to communicate with the appointment server 108 to schedule or reschedule an appointment. In one embodiment, the communication module 214 periodically updates the schedule based on information received from the appointment server 108 through the transceiver device 208.

It should be understood that even though the methods described above for determining whether it possible to communicate with the appointment server 108 to schedule or reschedule an appointment have been described separately, multiple methods can be used together. For example, to determine whether it is possible to communicate with the appointment server 108, the communication module 214 may analyze the signal strength information generated by the mobile device 106 and the schedule of when the appointment server 108 is unavailable.

Figure 7A:
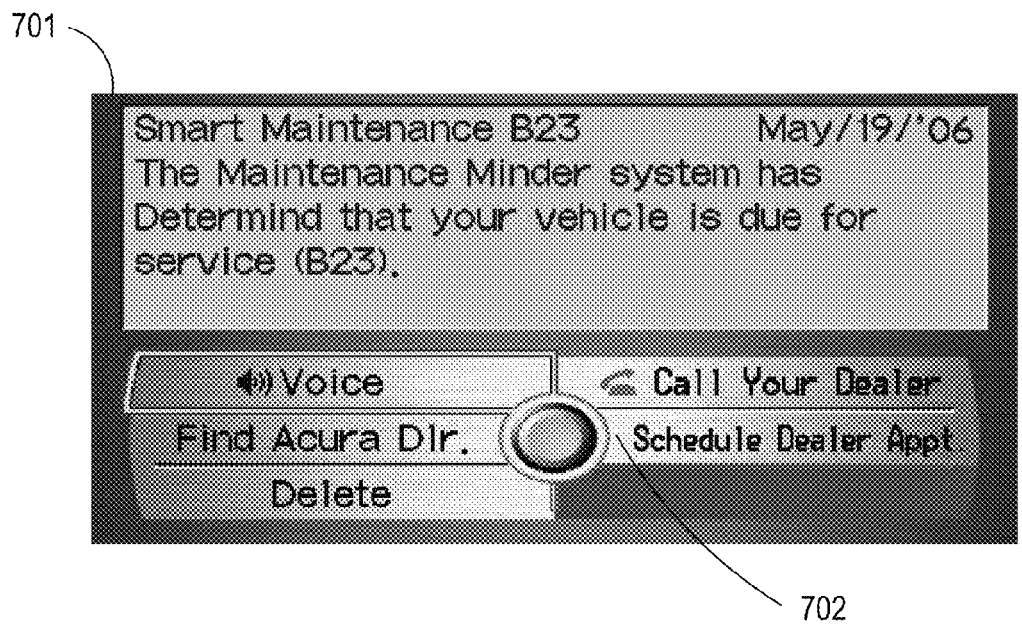
FIGS. 7A-7F are examples of displays that may be presented to a user of a vehicle during the process of scheduling or rescheduling a vehicle service appointment.

In one embodiment, the communication module 214 is continuously or periodically determining whether it is possible to communicate with the appointment server 108 to schedule or reschedule a service appointment. If the communication module 214 determines that it is possible to communicate with the appointment server 108, the communication module 214 collaborates with the input device 204 and the output device 206 to enable the appointment feature. When the appointment feature is enabled, a user of the vehicle has the option to request the scheduling or rescheduling of a service appointment. FIG. 7A shows an example of a display 701 that is presented to a user when the appointment feature is enabled. The display 701 comprises button 702, which indicates that the appointment feature is enabled. A user of the vehicle can request to schedule or reschedule a service appointment by selecting button 702 using the input device 206.

Figure 7B:
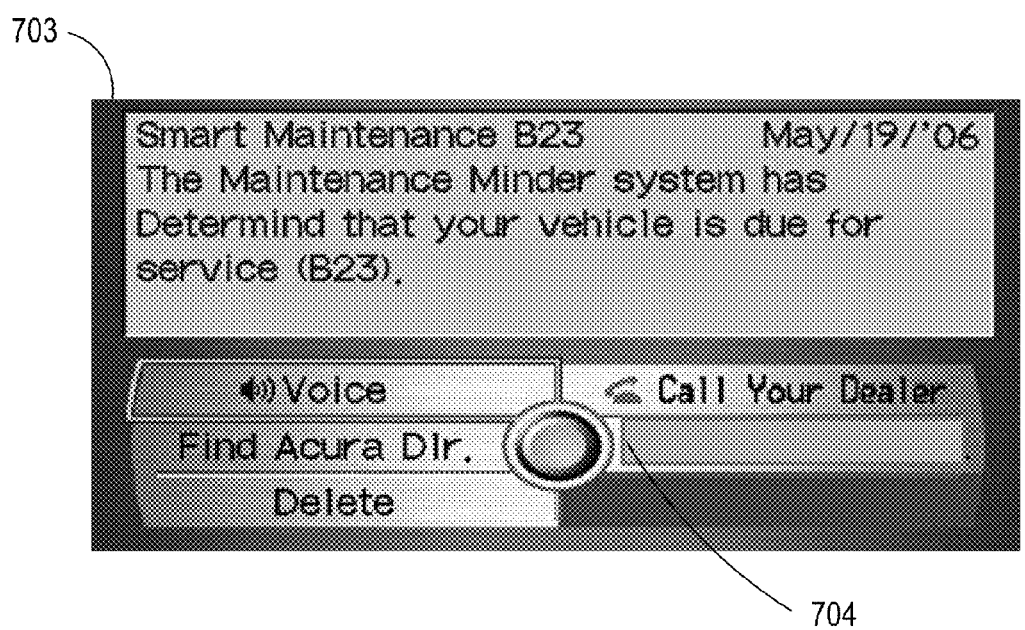

However, if the communication module 214 determines that it is not possible to communicate with the appointment server 108, the communication module 214 collaborates with the input device 204 and the output device 206 to disable the appointment feature. When the appointment feature is disabled, a user of the vehicle is unable make a request to schedule or reschedule a service appointment. FIG. 7B shows an example of a display 703 that is presented to a user when the appointment feature is disabled. As can be seen, area 704 is blank which means a user cannot make a request to schedule or reschedule a service appointment. Once the communication module 214 determines that it is possible to communicate with the appointment server 216, the communication module 214 enables the appointment feature.

In one embodiment, the communication module 214 determines whether it is possible to communicate with the appointment server 108, when a request is received from a user to schedule or reschedule a service appointment. If the communication module 214 determines that it is not possible to communicate with the appointment server 108, the communication module 214 disables the appointment feature. In one embodiment, the communication module 214 presents a message to the user which indicates that it is currently not possible to schedule or reschedule a service appointment. When the communication module 214 determines that it is possible to communicate with the appointment server 108, the communication module 214 enables the appointment feature and generates a message that indicates that it is currently possible to schedule or reschedule a service appointment. In one embodiment, the communication module 214 presents a message icon to the user, which indicates that a message has been generated. Upon the user selecting to view the message, the communication module 214 presents the message to the user.

Figure 7C:
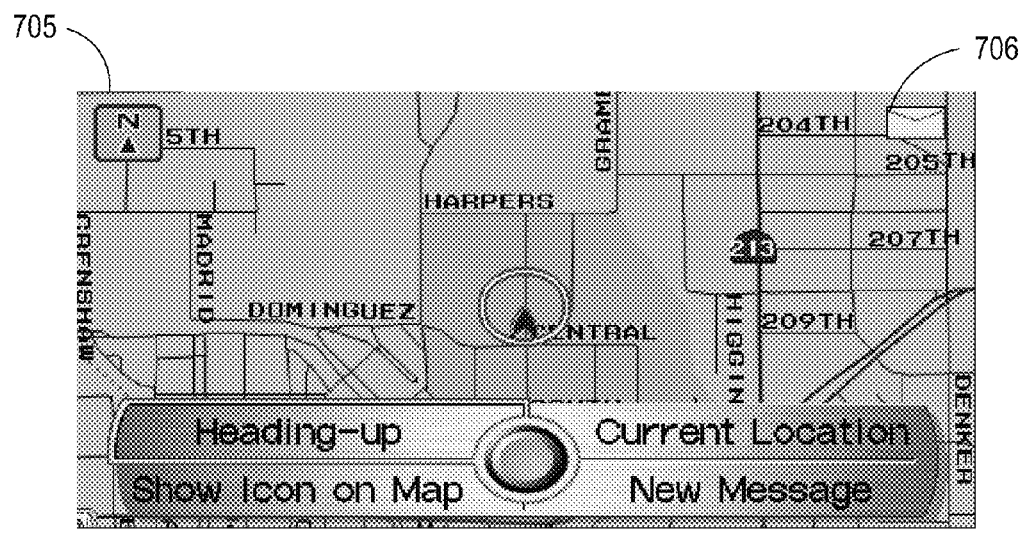
Figure 7D:
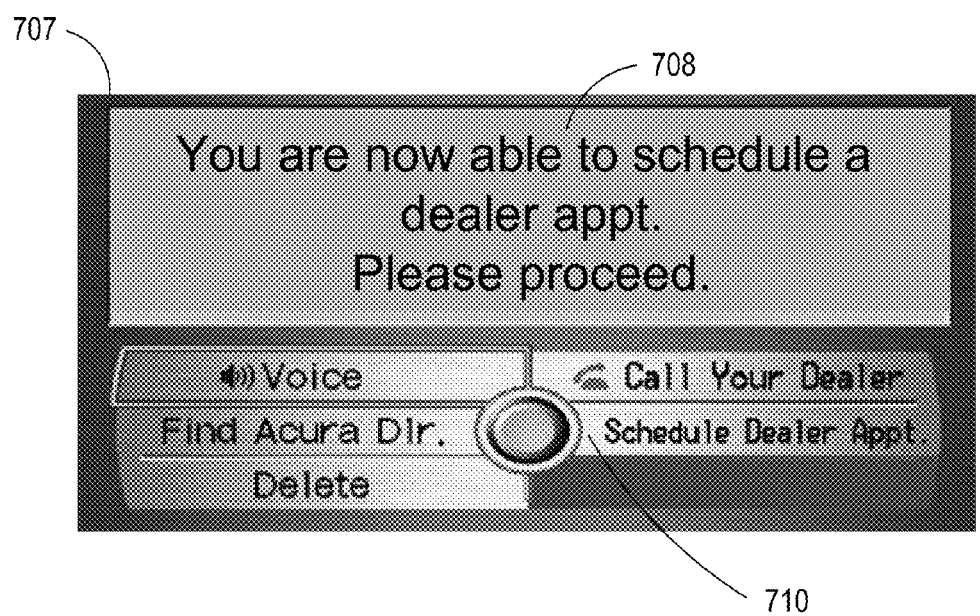

FIG. 7C is an example of a display 705 that is presented to a user when the message is generated. Message icon 706 indicates to the user that there is a new message. When the user selects to view the message, display 707 of FIG. 7D is presented to the user. The display includes the message 708 notifying the user that he or she can now request to schedule or reschedule a service appointment. Additionally, the display includes button 710, which allows the user to request the scheduling or rescheduling of a service appointment.

In one embodiment, instead of presenting a message to the user at the vehicle when it is determined that it is possible to communicate with the appointment server 108, the communication module 214 collaborates with the appointment module 216 to transmit an appointment request to the appointment server 108. The appointment request is transmitted automatically once it is determined that it is possible to communicate with the appointment server 108. Thus, no user input is required to transmit the appointment request to the appointment server 108. When a proposed appointment is received by the transceiver device 208 from the appointment server 108 in response to the request, the output device 206 presents the proposed appointment to the user.

In one embodiment, when the communication module 214 receives a request to schedule or reschedule an appointment and it is determined that it is not possible to communicate with the appointment server 108, the communication module 214 generates an off-board reminder message. The communication module 214 constantly or periodically determines whether it is possible to communicate a computing device to which the off-board reminder message is to be sent. When it is determined that it is possible to communicate with the computing device, the communication module 214 transmits the off-board reminder message to the computing device through the transceiver device 208. To determine whether it is possible to communicate with the computing device one of the methods described above for determining whether it is possible to communicate with the appointment server 108 is used. For example, the communication module 214 may determine whether it is possible to communicate with the computing device by analyzing signal strength information generated by the mobile device 106.

In one embodiment, the off-board reminder message is in the form of an email, a text message, an automated voicemail, or any other type of communication. In one embodiment, based on stored user preferences, the communication module 214 determines which type of off-board reminder message to generate and the computing device to which to transmit the message.

In one embodiment, the computing device to which the off-board reminder message is sent allows the user of the vehicle to access the message. The message reminds the user that a service appointment still needs to be scheduled or rescheduled. In another embodiment, the computing device to which the off-board reminder message is sent allows a third party to access the message. The reminder message notifies the third party that the user attempted to schedule or reschedule a service appointment, but was unable to. For example, the third party may a dealer and when the dealer receives the message, the dealer gives the user a call in order to schedule or reschedule an appointment.

The computing device to which the communication module 214 transmits the message may be, for example, a cell phone, a personal digital assistant (PDA), an email server, or a pager. In one embodiment, the computing device to which the off-board reminder message is sent is the appointment server 108 and the appointment server 108 stores the message or forwards the message to another computing device. If the message is stored at the appointment server 108, the user or a third party can access the message.

In one embodiment, instead of the communication module 214 generating the off-board reminder message, the communication module 214 transmits to the appointment server 108 a request for the appointment server 108 to generate the message. The appointment server 108 generates the off-board reminder message and transmits the message to the appropriate computing device.

The appointment module 216 communicates with the appointment server 108 to schedule or reschedule a vehicle service appointment. When a request is received from a user to schedule or reschedule a service appointment and the communication module 214 has determined that it is possible to communicate with the appointment server 108, the appointment module 216 transmits an appointment request to the appointment server 108.

Figure 7E:
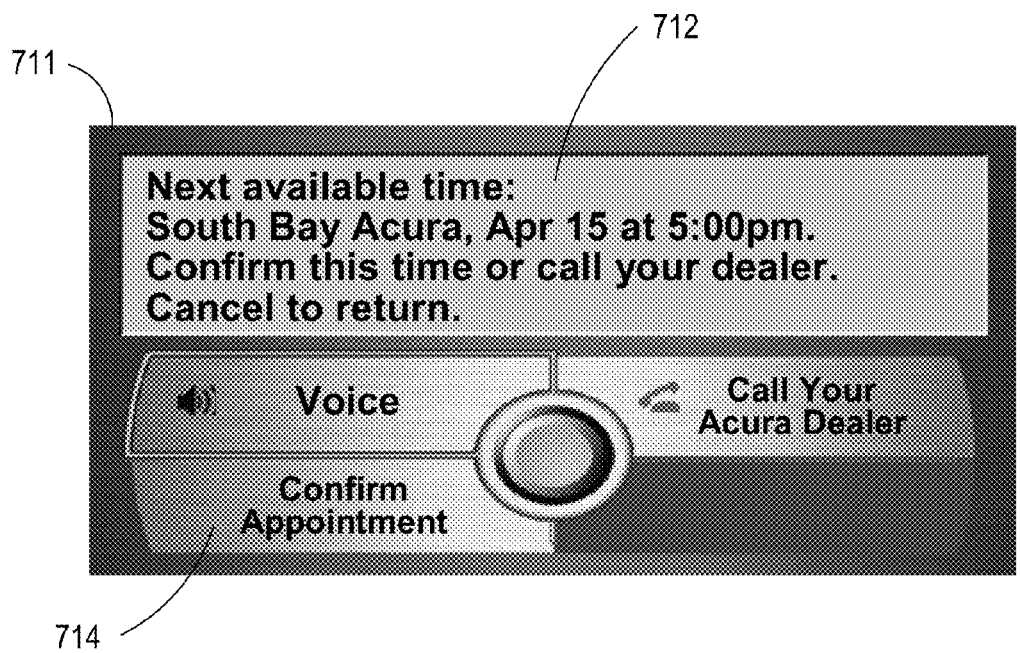

In response to the request transmitted, the appointment module 216 receives from the appointment server 108 a proposed date and time for an appointment. The appointment module 216 presents the proposed appointment to the user. Additionally, the appointment module 216 presents to the user the option of accepting or rejecting the proposed appointment. FIG. 7E is an example of a display 711 presented to a user to show the user the proposed appointment. Area 712 of the display 711 shows the proposed appointment and button 714 can be selected to accept the appointment.

Figure 7F:
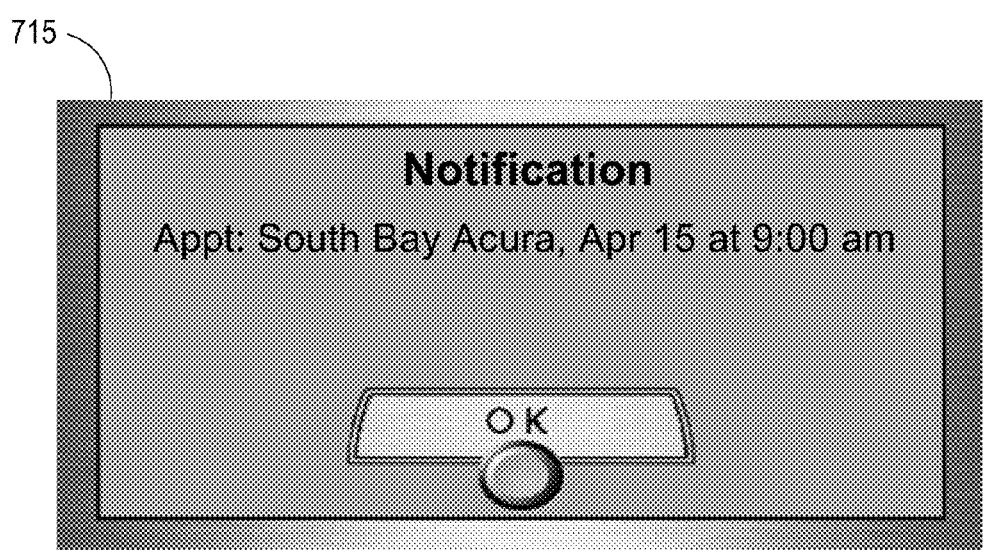

When the user inputs a decision, appointment accepted or rejected, the appointment module 216 transmits the user's decision to the appointment server 108. If the user accepted the proposed appointment and the appointment server 108 successfully scheduled the accepted appointment with the dealer, the appointment module 216 receives from the appointment server 108 a message confirming the scheduling of the appointment. The appointment module 216 presents the message to the user. FIG. 7F is an example of a display 715 presented to the user to confirm the scheduling of the accepted appointment. On the other hand, if the user rejected the appointment, the appointment module 216 receives from the appointment server 108 an alternate proposed appointment. The appointment module 216 presents the alternate proposed appointment to the user.

The direction module 218 provides a user of the vehicle 102 with driving directions. When a request is received from a user for directions to a desired location, the directions module 218 requests from the position detection module 210 the current geographical location of the vehicle. When the current location of the vehicle is received from the position detection device 210, the directions module 218 retrieves a vector map from a road database 220. The road database 220 is comprised of one or more vector maps.

The directions module 218 locates the current location of the vehicle in the map and the desired location. The directions module 218 determines a route to get from the current location to the desired location. Through the output device 206, the directions module 218 provides the user of the vehicle with directions on how to get to the desired location following the determined route. The directions are provided to the user orally and/or visually.

It should be apparent to one skilled in the art that navigation device 104 may include more or less components than those shown in FIG. 2 without departing from the spirit and scope of the present invention. For example, navigation device 104 may include additional memory, such as, for example, a first or second level cache, or one or more application specific integrated circuits (ASICs). Similarly, navigation device 104 may include additional input or output devices. In some embodiments of the present invention one or more of the components (202, 204, 206, 208, 210, 212, 214, 216, 218, and 220) can be positioned in close proximity to each other while in other embodiments these components can be positioned in different locations. For example the units in memory 212 can be programs capable of being executed by one or more processors 202 located in other devices in the vehicle 102.

Figure 3:
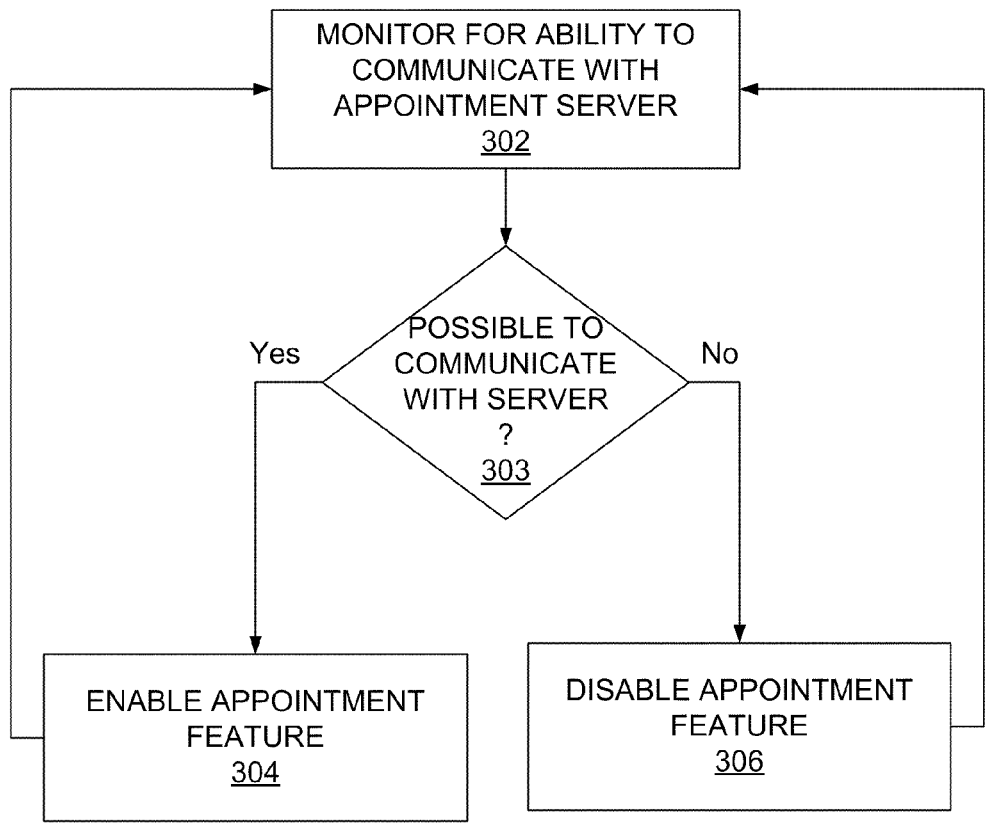
FIG. 3 is a flow chart of a method for enabling or disabling the feature of scheduling or rescheduling a vehicle service appointment from a vehicle 102 according to one embodiment.

FIG. 3 is a flow chart 300 of a method for enabling or disabling the feature of scheduling or rescheduling a vehicle service appointment from a vehicle 102 according to one embodiment. In one embodiment, the steps of the method are implemented by the processor 202 executing instructions that cause the desired actions. Those of skill in the art will recognize that one or more of the method steps may be implemented in embodiments of hardware and/or software or combinations thereof. For example, instructions for performing the described actions are embodied or stored within a computer readable medium. Furthermore, those of skill in the art will recognize that other embodiments can perform the steps of FIG. 3 in different orders. Moreover, other embodiments can include different and/or additional steps than the ones described here.

The navigation device 104 monitors 302 for the ability to communicate with the appointment server 108 to schedule or reschedule a service appointment. If 303 it is determined that it is possible to communicate with the appointment server 108, the navigation device 104 enables 304 the appointment feature. However, if 303 it is determined that it is not possible to communicate with the appointment server 108, the navigation device 104 disables 306 the appointment feature. Once the appointment feature is either enabled or disabled, the navigation device 104 continues to monitor whether is possible to communicate with the appointment server 108.

Figure 4:
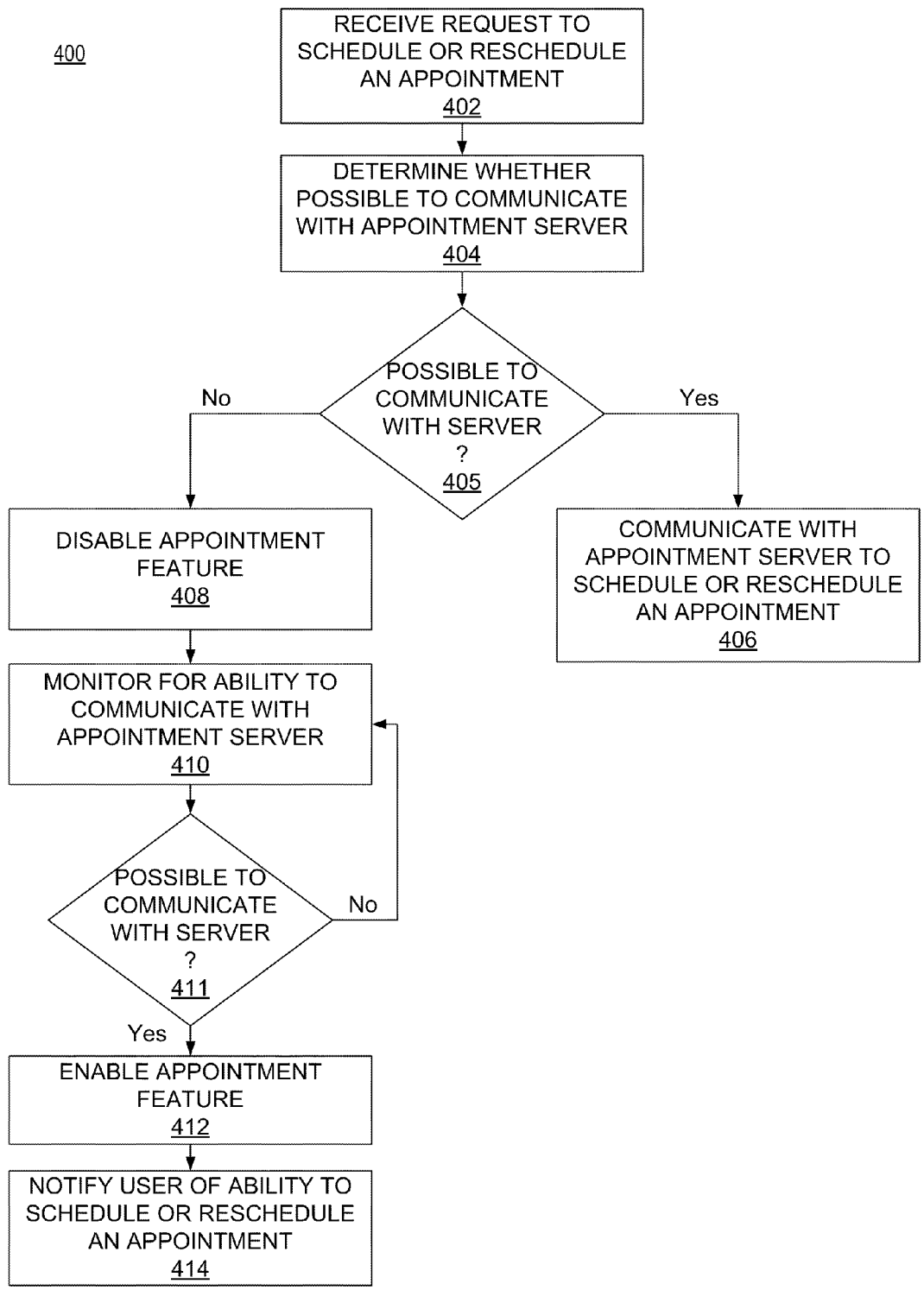
FIG. 4 is a flow chart of a method for scheduling or rescheduling a vehicle service appointment according to one embodiment.

FIG. 4 is a flow chart 400 of a method for scheduling or rescheduling a vehicle service appointment according to one embodiment. In one embodiment, the steps of the method are implemented by the processor 202 executing instructions that cause the desired actions. Those of skill in the art will recognize that one or more of the method steps may be implemented in embodiments of hardware and/or software or combinations thereof. Furthermore, those of skill in the art will recognize that other embodiments can perform the steps of FIG. 4 in different orders. Moreover, other embodiments can include different and/or additional steps than the ones described here.

Initially, the navigation device 104 receives 402 a request from a user of the vehicle 102 to schedule or reschedule a vehicle service appointment. The navigation device 104 determines 404 whether it is possible to communicate with the appointment server 108 to schedule or reschedule a service appointment. If 405 it is determined that it is possible to communicate with the appointment server 108, the navigation device 108 communicates 406 with the appointment server 108 to schedule or reschedule a service appointment.

However, if 405 it is determined that it is not possible to communicate with the appointment server 108, the navigation device 104 disables 408 the appointment feature. The appointment server 108 monitors 410 for the ability to communicate with the appointment server 108. Once it is determined 411 that it is possible to communicate with the appointment server 108, the navigation device 104 enables 412 the appointment feature. The navigation device 104 presents 414 a message to the user which notifies the user that it is now possible to schedule or reschedule a service appointment.

Figure 5:
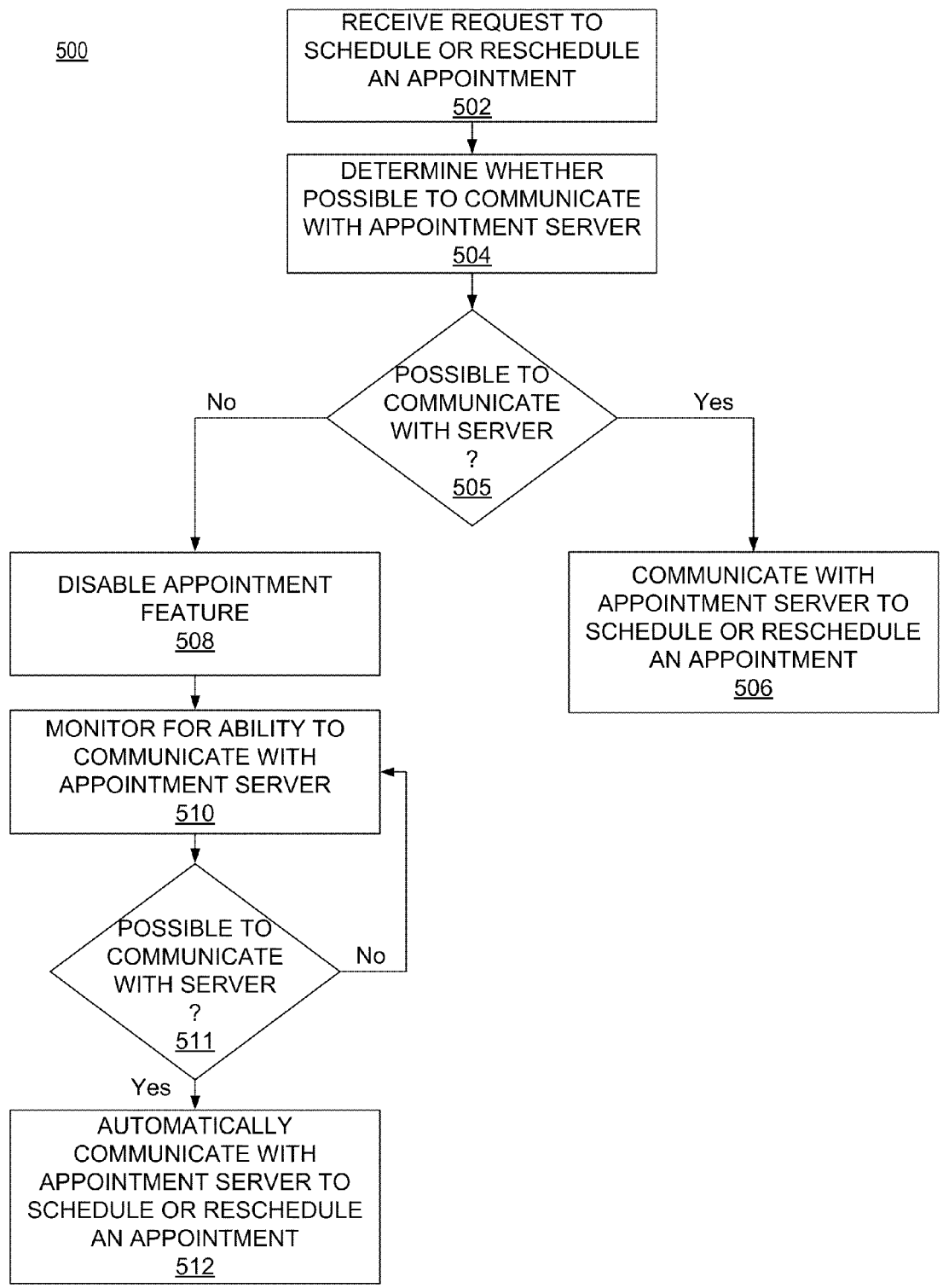
FIG. 5 is a flow chart of a method for scheduling or rescheduling a vehicle service appointment according to an alternate embodiment.

FIG. 5 is a flow chart 500 of a method for scheduling or rescheduling a vehicle service appointment according to an alternate embodiment. In one embodiment, the steps of the method are implemented by the processor 202 executing instructions that cause the desired actions. Those of skill in the art will recognize that one or more of the method steps may be implemented in embodiments of hardware and/or software or combinations thereof. Furthermore, those of skill in the art will recognize that other embodiments can perform the steps of FIG. 5 in different orders. Moreover, other embodiments can include different and/or additional steps than the ones described here.

Initially, the navigation device 104 receives 502 a request from a user of the vehicle 102 to schedule or reschedule a vehicle service appointment. The navigation device 104 determines 504 whether it is possible to communicate with the appointment server 108 to schedule or reschedule a service appointment. If 505 it is determined that it is possible to communicate with the appointment server 108, the navigation device 108 communicates 506 with the appointment server 108 to schedule or reschedule a service appointment.

However, if 505 it is determined that it is not possible to communicate with the appointment server 108, the navigation device 104 disables 508 the appointment feature. The appointment server 108 monitors 510 for the ability to communicate with the appointment server 108. Once it is determined 511 that it is possible to communicate with the appointment server 108, the navigation device 104 automatically communicates 512 with the appointment server 108 to schedule or reschedule a service appointment. Communicating with the appointment server 108 to schedule or reschedule a service appointment comprises transmitting an appointment request to the appointment server 108.

Figure 6:
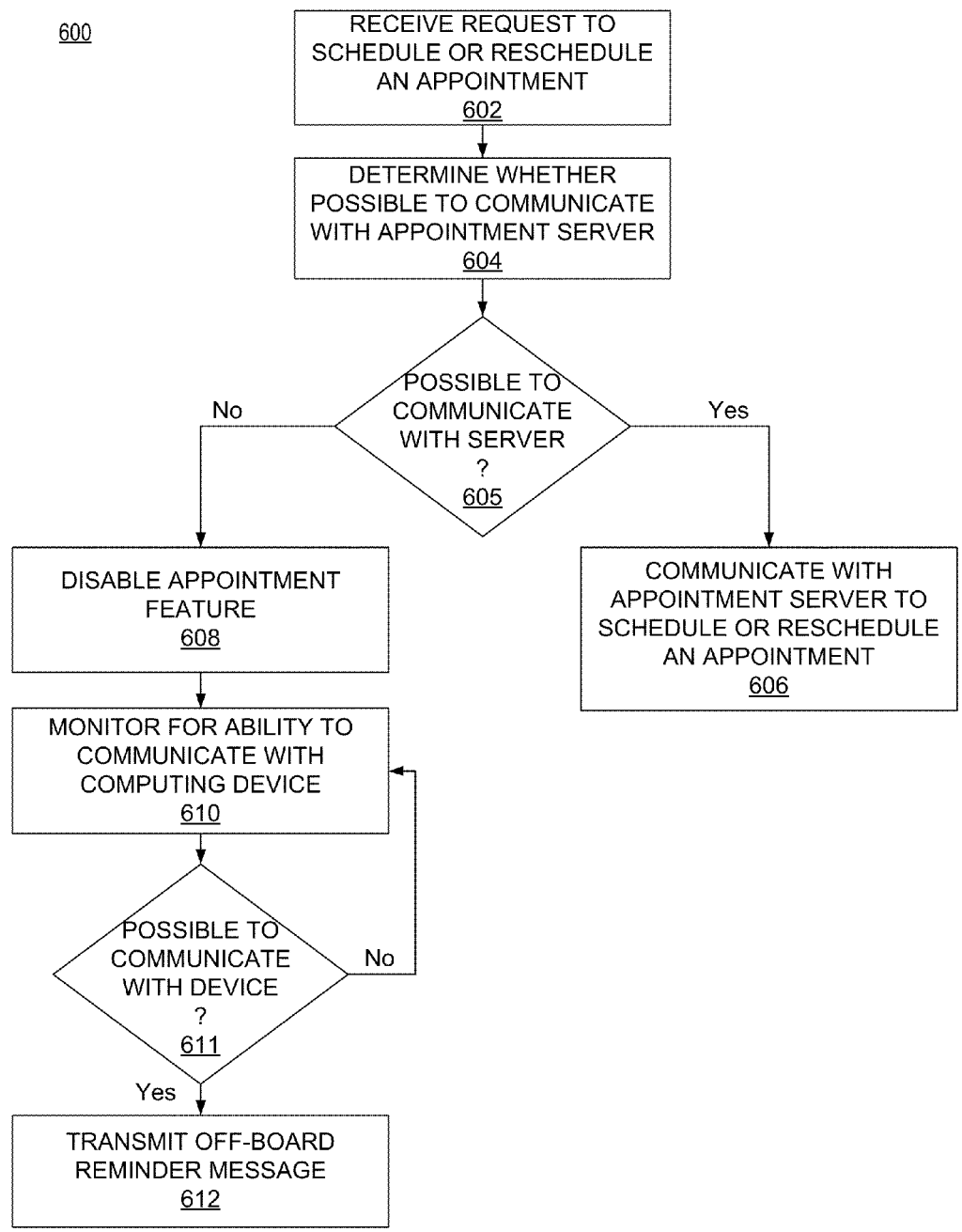
FIG. 6 is a flow chart of a method for scheduling or rescheduling a vehicle service appointment according to an alternate embodiment.

FIG. 6 is a flow chart 600 of a method for scheduling or rescheduling a vehicle service appointment according to an alternate embodiment. In one embodiment, the steps of the method are implemented by the processor 202 executing instructions that cause the desired actions. Those of skill in the art will recognize that one or more of the method steps may be implemented in embodiments of hardware and/or software or combinations thereof. Furthermore, those of skill in the art will recognize that other embodiments can perform the steps of FIG. 6 in different orders. Moreover, other embodiments can include different and/or additional steps than the ones described here.

Initially, the navigation device 104 receives 602 a request from a user of vehicle 102 to schedule or reschedule a vehicle service appointment. The navigation device 104 determines 604 whether it is possible to communicate with the appointment server 108 to schedule or reschedule a service appointment. If 605 it is determined that it is possible to communicate with the appointment server 108, the navigation device 108 communicates 606 with the appointment server 108 to schedule or reschedule a service appointment.

However, if 605 it is determined that it is not possible to communicate with the appointment server 108, the navigation device 104 disables 508 the appointment feature. The appointment server 108 monitors 610 for the ability to communicate with a computing device to which an off-board reminder message will be sent. When it is determined 611 that it is possible to communicate with the computing device, the navigation device 104 transmits 612 the off-board reminder message to the computing device. The off-board reminder message indicates that the user requested to schedule or reschedule a service appointment, but was unable to.

While particular embodiments and applications of the present invention have been illustrated and described herein, it is to be understood that the invention is not limited to the precise construction and components disclosed herein and that various modifications, changes, and variations may be made in the arrangement, operation, and details of the methods and apparatuses of the present invention without departing from the spirit and scope of the invention as it is defined in the appended claims.

The invention claimed is:

1. A computer based method comprising:
responsive to determining that it is not possible to communicate with an appointment server to schedule a vehicle service appointment, disabling, at a vehicle, an appointment feature configured to receive a request to schedule a vehicle service appointment from the vehicle through the appointment server;
monitoring, based on the determination, for the ability to communicate with the appointment server; and
responsive to detecting via the monitoring that it is possible to communicate with the appointment server, enabling the appointment feature and presenting a message indicating that it is possible to request the scheduling of a vehicle service appointment.

2. The method of claim 1, wherein monitoring for the ability to communicate with the appointment server comprises:
analyzing signal strength information generated by a mobile device, wherein the mobile device is used to communicate with the appointment server;
responsive to the signal strength information satisfying set criteria, determining that it is possible to communicate with the appointment server; and
responsive to the signal strength information not satisfying set criteria, determining that it is not possible to communicate with the appointment server.

3. The method of claim 2, wherein the signal strength information represents the ability of the mobile device to communicate with computing devices connected to a mobile communication network and wherein the appointment server is connected to the mobile communication network.

4. The method of claim 1, wherein monitoring for the ability to communicate with the appointment server comprises:
analyzing signal strength information generated by a position detection device, wherein the position detection device communicates with one or more satellites;
responsive to the signal strength information satisfying set criteria, determining that it is possible to communicate with the appointment server; and
responsive to the signal strength information not satisfying set criteria, determining that it is not possible to communicate with the appointment server.

5. The method of claim 4, wherein the signal strength information represents the ability of the position detection device to communicate with the one or more satellites.

6. The method of claim 1, wherein monitoring for the ability to communicate with the appointment server comprises:
attempting to communicate with the appointment server;
responsive to communicating with the appointment server, determining that it is possible to communicate with the appointment server; and
responsive to failing to communicate with the appointment server, determining that it is not possible to communicate with the appointment server.

7. The method of claim 1, wherein determining that it is not possible to communicate with the appointment server comprises:
determining whether a current date and time is included in a schedule that indicates dates and times when the appointment server is unavailable; and
responsive to determining that the current date and time is included in the schedule, determining that it is not possible to communicate with the appointment server.

8. A computer based method comprising:
receiving, at a vehicle via an appointment feature, a request to schedule a vehicle service appointment;
responsive to determining that it is not possible to communicate with an appointment server to schedule the appointment, disabling the appointment feature and monitoring for the ability to communicate with the appointment server; and
responsive to detecting via the monitoring that it is possible to communicate with the appointment server, automatically transmitting to the appointment server, the request to schedule the appointment.

9. The method of claim 8, wherein monitoring for the ability to communicate with the appointment server comprises:
analyzing signal strength information generated by a mobile device, wherein the mobile device is used to communicate with the appointment server;
responsive to the signal strength information satisfying set criteria, determining that it is possible to communicate with the appointment server; and
responsive to the signal strength information not satisfying set criteria, determining that it is not possible to communicate with the appointment server.

10. The method of claim 9, wherein the signal strength information represents the ability of the mobile device to communicate with computing devices connected to a mobile communication network and wherein the appointment server is connected to the mobile communication network.

11. The method of claim 8, wherein monitoring for the ability to communicate with the appointment server comprises:
- analyzing signal strength information generated by a position detection device, wherein the position detection device communicates with one or more satellites;
- responsive to the signal strength information satisfying set criteria, determining that it is possible to communicate with the appointment server; and
- responsive to the signal strength information not satisfying the set criteria, determining that it is not possible to communicate with the appointment server.

12. The method of claim 11, wherein the signal strength information represents the ability of the position detection device to communicate with the one or more satellites.

13. The method of claim 8, wherein monitoring for the ability to communicate with the appointment server comprises:
- attempting to communicate with the appointment server;
- responsive to communicating with the appointment server, determining that it is possible to communicate with the appointment server; and
- responsive to failing to communicate with the appointment server, determining that it is not possible to communicate with the appointment server.

14. The method of claim 8, wherein determining that it is not possible to communicate with the appointment server comprises:
- determining whether a current date and time is included in a schedule that indicates dates and times when the appointment server is unavailable; and
- responsive to determining that the current date and time is included in the schedule, determining that it is not possible to communicate with the appointment server.

15. A computer based method comprising:
- receiving, at a vehicle, a request to schedule a vehicle service appointment;
- responsive to determining that it is not possible to communicate with an appointment server to schedule the appointment, monitoring for the ability to communicate with a computing device external to the vehicle; and
- responsive to detecting via the monitoring that it is possible to communicate with the computing device, transmitting to the computing device a reminder message indicating that the service appointment has not been scheduled.

16. The method of claim 15, wherein the computing device forwards the message to a cell phone.

17. The method of claim 15, wherein the computing device is an email server.

18. The method of claim 15, wherein the computing device is the appointment server.

19. The method of claim 15, wherein the reminder message is an email, a text message, or a voicemail.

20. The method of claim 15, wherein the computing device allows a user that requested the vehicle service appointment to access the message.

21. The method of claim 15, wherein the computing device allows a third party, different than a user that requested the vehicle service appointment, to access the message.

22. The method of claim 15, wherein transmitting to the computing device the reminder message comprises:
- transmitting the reminder message to the appointment server for the appointment server to forward the message to the computing device.

23. The method of claim 15, wherein transmitting to the computing device the reminder message comprises:
- transmitting a request to the appointment server to generate the reminder message, wherein the appointment server generates the message and transmits the message to the computing device.

24. The method of claim 15, further comprising:
- responsive to determining that it is not possible to communicate with the appointment server, disabling an appointment feature which allows the scheduling of a vehicle service appointment from the vehicle.

25. The method of claim 15, wherein monitoring for the ability to communicate with the computing device comprises:
- analyzing signal strength information generated by a mobile device, wherein the mobile device is used to communicate with the computing device;
- responsive to the signal strength information satisfying set criteria, determining that it is possible to communicate with the computing device; and
- responsive to the signal strength information not satisfying set criteria, determining that it is not possible to communicate with the computing device.

26. The method of claim 25, wherein the signal strength information represents the ability of the mobile device to communicate with computing devices connected to a mobile communication network.

27. The method of claim 15, wherein monitoring for the ability to communicate with the computing device comprises:
- analyzing signal strength information generated by a position detection device, wherein the position detection device communicates with one or more satellites;
- responsive to the signal strength information satisfying set criteria, determining that it is possible to communicate with the computing device; and
- responsive to the signal strength information not satisfying set criteria, determining that it is not possible to communicate with the computing device.

28. The method of claim 27, wherein the signal strength information represents the ability of the position detection device to communicate with the one or more satellites.

29. The method of claim 15, wherein monitoring for the ability to communicate with the computing device comprises:
- attempting to communicate with the computing device;
- responsive to communicating with the computing device determining that it is possible to communicate with the computing device; and
- responsive to failing to communicate with the computing device, determining that it is not possible to communicate with the computing device.

30. The method of claim 15, wherein determining that it is not possible to communicate with the appointment server comprises:
- determining whether a current date and time is included in a schedule that indicates dates and times when the appointment server is unavailable; and
- responsive to determining that the current date and time is included in the schedule, determining that it is not possible to communicate with the appointment server.

* * * * *